(12) United States Patent
Houg-Blymyer

(10) Patent No.: US 6,792,712 B1
(45) Date of Patent: Sep. 21, 2004

(54) FISHING LINE LEADER HOLDER SYSTEM

(76) Inventor: Susan M. Houg-Blymyer, 6906 205th St. SE., Shohomish, WA (US) 98296

( * ) Notice: Subject to any disclaimer, the term of this patent is extended or adjusted under 35 U.S.C. 154(b) by 0 days.

(21) Appl. No.: 10/425,200

(22) Filed: Apr. 29, 2003

(51) Int. Cl.$^7$ .............................................. A01K 00/00
(52) U.S. Cl. ..................... 43/4; 43/4.5; 43/1; 24/16 PB
(58) Field of Search ................. 43/4.5, 4, 1; 242/125.3, 242/171, 172, 422.6, 125.2; 24/268, 277, 278, 30.5 P, 16 PB; 403/203, 281, 222, 225, 365, 366, 367

(56) References Cited

U.S. PATENT DOCUMENTS

| | | | | |
|---|---|---|---|---|
| 397,999 | A | * | 2/1889 | Pratt et al. ................ 242/125.3 |
| 583,176 | A | * | 5/1897 | Harvey ..................... 242/125.3 |
| 1,162,195 | A | * | 11/1915 | Spencer ...................... 403/165 |
| 1,222,703 | A | * | 4/1917 | White ..................... 242/125.3 |
| 1,817,774 | A | * | 8/1931 | Sipe ........................... 285/231 |
| 1,923,456 | A | * | 8/1933 | Price ........................... 206/400 |
| 2,689,755 | A | * | 9/1954 | Krotz ........................... 403/221 |
| 2,846,243 | A | * | 8/1958 | Jewell ......................... 285/369 |
| 3,195,722 | A | * | 7/1965 | Duden .......................... 206/53 |
| 3,700,185 | A | * | 10/1972 | Hubbard et al. ............ 242/159 |
| 4,534,522 | A | * | 8/1985 | Spence ....................... 242/172 |
| 4,636,106 | A | * | 1/1987 | Waisbrod .................... 403/228 |
| 4,813,109 | A | * | 3/1989 | McCully et al. .............. 24/278 |
| 5,246,185 | A | * | 9/1993 | Vincent ................... 242/125.3 |
| 5,449,128 | A | * | 9/1995 | Crisci, Jr. ................... 242/580 |
| 5,639,043 | A | * | 6/1997 | Baird ...................... 242/419.4 |
| 5,775,625 | A | * | 7/1998 | Shimomura .............. 242/422.6 |
| 6,637,689 | B1 | * | 10/2003 | Vega .......................... 242/172 |

* cited by examiner

Primary Examiner—Peter M. Poon
Assistant Examiner—Joan M. Olszewski
(74) Attorney, Agent, or Firm—Hugh D. Jaeger

(57) ABSTRACT

A fishing line leader holder system for holding a fishing line leader. An elastic band having an attached bead between two ends of the elastic band aligns about the circumference of fishing line on a supply spool and where the fishing line leader passes through the bead for easy access and grasping. The fishing line leader holder system also compresses the wound fishing line about the supply spool to stop unraveling of the fishing line about the supply spool but allows easy dispensing of the fishing line from the supply spool when desired.

20 Claims, 6 Drawing Sheets

FISHING LINE LEADER HOLDER SYSTEM

CROSS REFERENCES TO RELATED APPLICATIONS

None.

BACKGROUND OF THE INVENTION

1. Field of the Invention

The present invention pertains to fishing equipment and more particularly pertains to a fishing line leader holder system for the holding and retaining of a fishing line leader on a fishing line supply spool, for containment of fishing line about a fishing line supply spool, and for orderly dispensing of fishing line from a fishing line supply spool.

2. Description of the Prior Art

Fishing line is often sold packaged on a supply spool for subsequent transfer to a fishing reel generally on a fishing rod. Most fishing line is of monofilament material having many excellent qualities most of which are desirable when in use for fishing. One such quality is that of having a smooth surface having a low coefficient of friction whereby the fishing line can pass easily with little frictional hinderance through the mechanisms of the fishing reel or the fishing rod. Such low friction and slippery-like surfaces are excellent for the workings and mechanisms of fishing rods and reels, but present some qualities not altogether suitable for easy effected storage on the supply spool. A generous amount of fishing line is often provided with prepackaged fishing line supply spools, generally providing enough length for loading of one or more reels, thereby leaving ample amounts of fishing line remaining on the supply spool. One tendency of the line remaining on the supply spool is for the line to unravel and expand in profile about the spool. Such unraveling is a nuisance for several reasons. During unraveling or loosening about the supply spool, the end of the fishing line, often called the leader, becomes difficult to find and grasp, or it can be relocated to a position distant to the supply reel in a state of untidiness. Also, a few loops or copious amounts of loops of fishing line can become disengaged from the supply reel in one big mess in the bottom of the angler's tackle box or fishing boat. To combat such unwanted folly, anglers have resorted to time-honored but not long lasting or convenient solutions to contain unruly fishing line and to keep the leader accessible and ready for grasping and dispensing. One such solution was to place a rubber band around and about the fishing line contained on the supply spool, only to find later that with age, heat, cold and other factors, the rubber band would deteriorate, thereby disengaging from the fishing line and/or the fishing line leader and thereby causing unraveling of the fishing line and unwanted displacement of the leader from a convenient position about the supply spool. If the rubber band would survive the rigors of age, heat, cold and the like, the problem of grasping and removal of a substantially flattened rubber band for subsequent line dispensing and leader grasping was difficult at best. Even more difficult is retrieving a loose leader and dispensation of the fishing line where a small amount of fishing line remains on the supply spool and the rubber band is placed deep and in low profile between the sides of the spool where an individual's fingers could have a hard time entering. Other anglers resort to using tape such as masking tape, electrical tape or the like to contain fishing line and to maintain control of the leader, but tape too has its downfalls which often are the same as those associated with the use of a rubber band. Age, time and other environmental factors cause the use of tape to be unsatisfactory where the tape becomes brittle, weak and generally ineffective. Sometimes the tape sticks so well to itself that it is difficult to remove, as well as being difficult to grasp; or the tape coupled with age and heat forms itself to the fishing line and proves to be difficult to remove. Gummy adhesive residue from the tape can be deposited on the surface of the fishing line, thereby impeding the almost friction-free passage of the fishing line through the mechanisms of the rod and reel. Aside from these problems, when fishing in cold environs, it is very difficult to grasp or retrieve a fishing line leader from a supply spool whether the fishing line is trained about the supply spool in an orderly fashion or in a state of disarray.

Clearly what is needed is a device or method which overcomes the shortcomings of the prior art such as is provided by the instant invention.

SUMMARY OF THE INVENTION

The general purpose of the present invention is to provide a fishing line leader holder system which maintains control of the loose end or leader of a fishing line residing on a supply spool. The fishing line leader is engaged by the fishing line leader system to control the fishing line leader so as to keep the fishing line leader readily displayed and accessible for instant use. The fishing line leader system also expandingly engages around and about the fishing line on a supply spool to stop unraveling of the fishing line while at the same time maintaining positional control of the synonymously named fishing line loose end or fishing line leader. The fishing line leader holder system includes an elastic band suitably attached at both ends between a bead having substantially a toroidal shape and a short section of flexible PVC tubing. An orifice central to the bead accommodates the fishing line leader and in conjunction with the elastic band forcefully positions and holds the fishing line leader to the underlying fishing line which is wound about the supply spool. A grasping knob consisting of the bead, the PVC tubing, and the encompassed ends of the elastic band can be readily accessed by an individual to install or remove the fishing line leader holder system to or from a supply spool or to place or slidingly position the instant invention around and about the supply spool and fishing line engaged thereupon. The instant invention can be employed in a static position to hold, to control, to position and to display the line leader and/or simply to retain and control the fishing line on the supply spool, or can be employed in an active state where the fishing line leader holder system is slidingly positioned about the fishing line on the supply spool to dispense fishing lin or to take up fishing line slack about the supply spool.

According to one embodiment of the present invention, there is provided a fishing line leader holder system including an elastic band, a bead having a centrally located orifice, and a flexible PVC tubing. The ends of the elastic band secure by frictional engagement and by the use of a suitable adhesive between the bead and the flexible PVC tubing.

One significant aspect and feature of the present invention is a fishing line leader holder system which holds, displays, controls and positions the lead portion of a fishing line.

Another significant aspect and feature of the present invention is a fishing line leader holder system which holds and minimizes the profile and shape of fishing line wound about a supply spool.

Yet another significant aspect and feature of the present invention is a fishing line leader holder system which allows dispensing of fishing line in a controllable manner while maintaining control of the leader and while maintaining the general overall shape and status of the fishing line wound about a supply spool. Having thus described embodiments of the present invention, it is the principal object of the present invention to provide a fishing line leader holder system.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
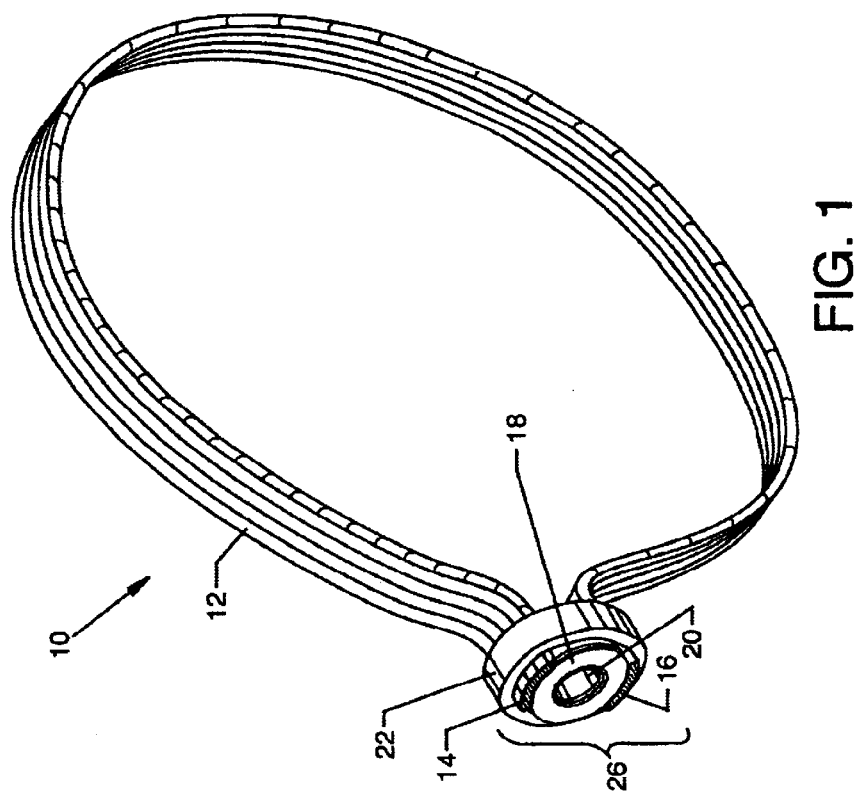
FIG. 1 illustrates an isometric view of the fishing line leader holder system, the present invention.
Figure 2:
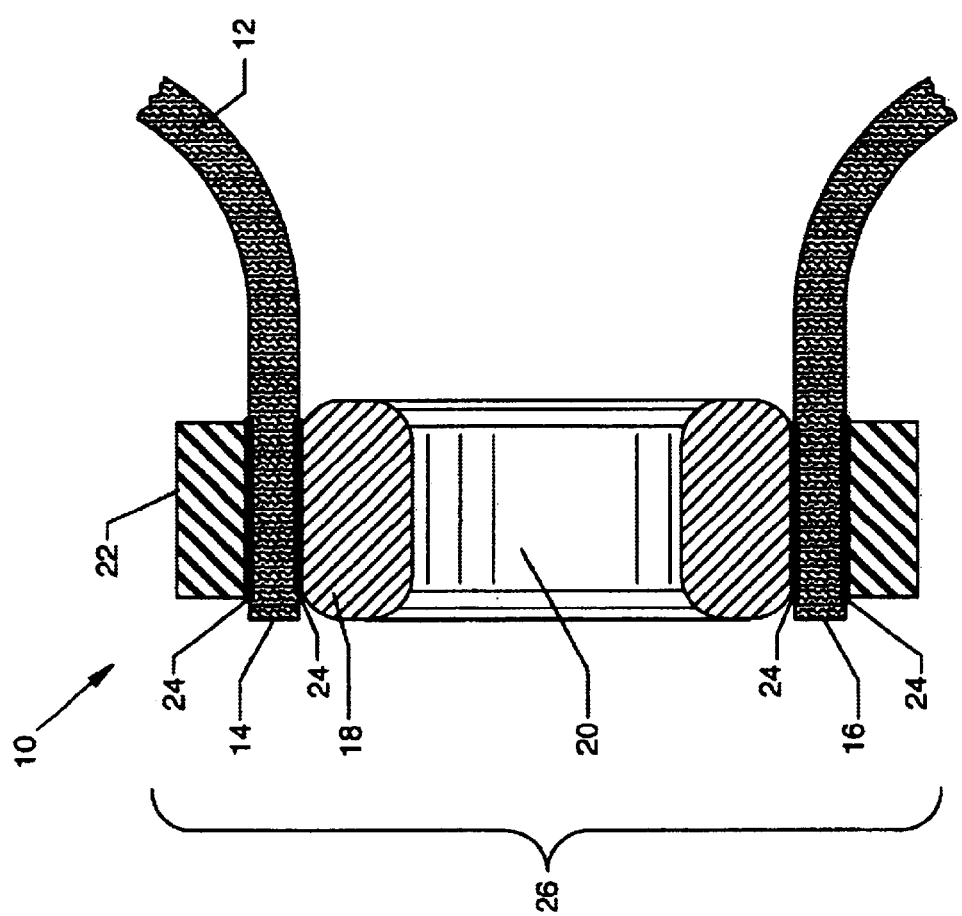
FIG. 2 is a cross section view of the fishing line leader holder system illustrating the frictional engagement of the ends of an elastic band between a bead and a short section of PVC tubing.

FIG. 1 illustrates an isometric view of the fishing line leader holder system 10, the present invention. An elastic band 12 of suitable length, generally being a length less than the outer circumference of fishing line wound about a supply spool and which is expandable, includes opposing ends 14 and 16 secured adhesively and forcibly between a toroid-like bead 18 having a centrally located orifice 20 and a short section of encompassing PVC (polyvinyl chloride) tubing 22 which is flexible. The union of the opposing ends 14 and 16 to the bead 18 and the PVC tubing 22 is accomplished by the use of a proper adhesive 24 (FIG. 2) such as, but not limited to, Super Glue®, epoxy, or the like, where the opposing ends 14 and 16 are adhesively fastened to the interior of the PVC tubing 22 and where the bead 18 is forcibly located in frictional engagement between the opposing ends 14 and 16 and also against portions of the PVC tubing 22 as well as against the encompassing force of the flexible and surrounding PVC tubing 22 in any suitable order of construction. Adhesive 24 can be incorporated in one or more areas, as shown in FIG. 2. Alternatively, the opposing ends 14 and 16 of the elastic band 12 could first be attached to the outer surfaces of the bead 18 by adhesive 24 and then the PVC tubing 22 having been pre-located over the elastic band 12 at a location distant to the ends 14 and 16, could then be stretchingly maneuvered over and about the ends 14 and 16 with adhesive 24 therebetween to form a suitable junction whereby a grasping knob 26 is formed. The junction of the bead 18, the ends 14 and 16 of the elastic band 12, and the PVC tubing 22 form a structure suitable in part for holding a fishing line leader as well as forming the grasping Knob 26 suitable for positioning of the fishing line leader holder system 10, as later described in detail.

FIG. 2 is a cross section view of the fishing line leader holder system 10 illustrating the frictional engagement of the ends 14 and 16 of the elastic band 12 between the bead 18 and the PVC tubing 22. Also securing the union of the engaged ends 14 and 16 of the elastic band 12 with and between the bead 18 and the PVC tubing 22 is the adhesive 24 incorporated preferably between the ends 14 and 16 of the elastic band 12 and the interior surface of the PVC tubing 22 and additionally or in the alternative between the ends 14 and 16 of the elastic band 12 and the outer circumference of the bead 18.

Figure 3:
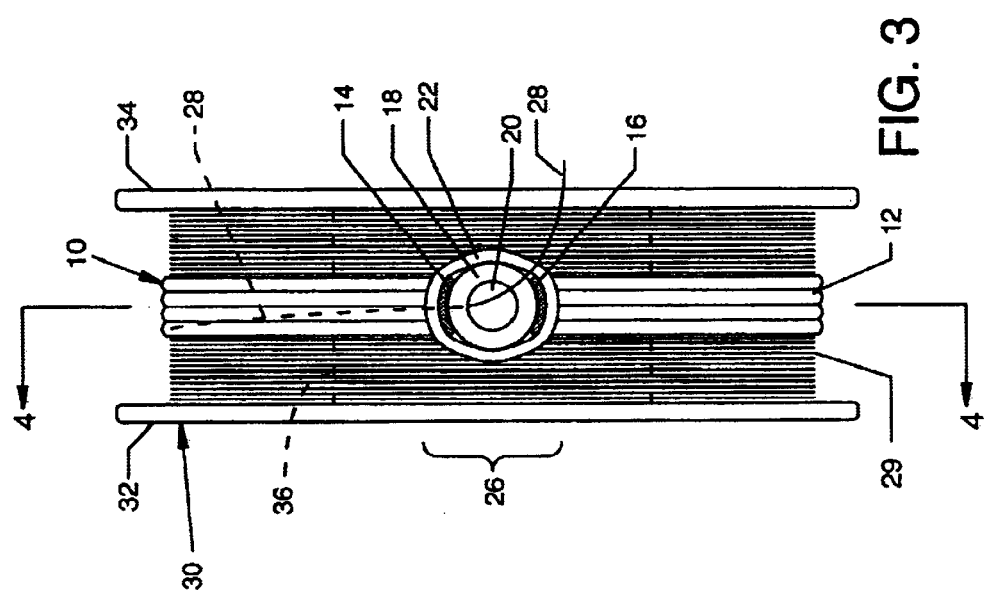
FIG. 3 illustrates the fishing line leader holder system incorporated into use to hold and secure a fishing line leader and wound fishing line to a supply spool.

FIG. 3 illustrates the fishing line leader holder system 10 incorporated into use to hold and secure a fishing line leader 28 and wound fishing line 29 to a supply spool 30 having opposing sides 32 and 34 and a central drum 36 therebetween. The fishing line leader 28 is shown extending through and outwardly from the orifice 20 of the bead 18 and is also shown in dashed lines being held and engaged against the underlying wound fishing line 29 by the elastic band 12 which is in tight engagement against the wound fishing line 29 and the fishing line leader 28. The width of the elastic band 12 can be of a suitable dimension to extend over and about a greater portion of the wound fishing line 29 to achieve suitable contact with the wound fishing line 29 as required and according to the breadth of the drum 36.

Figure 4:
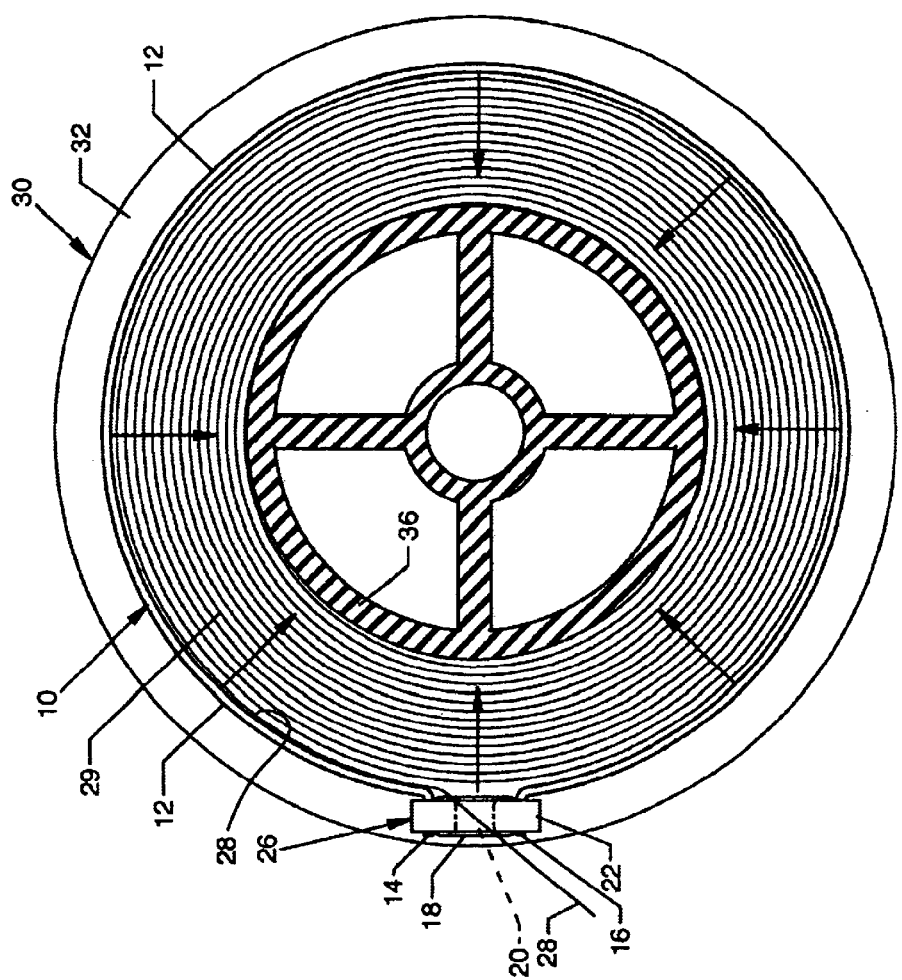
FIG. 4 illustrates a partial cross section view of the supply spool along line 4—4 of FIG. 3 showing the fishing line leader holder system engaging and holding a fishing line leader and fishing line wound about a supply spool.

FIG. 4 illustrates a partial cross section view of the supply spool 30 along line 4—4 of FIG. 3 showing the fishing line leader holder system 10 engaging and displaying the fishing line leader 28 and engaging the wound fishing line 29 contained mainly between the sides 32 and 34 (FIG. 3) of the spool 30 and the spool drum 36. The elastic band 12 of the fishing line leader holder system 10 exerts pressure inwardly towards and about the drum 36 to compress the wound fishing line 29 including the section of fishing line which is adjacent to the bead 18, which is actually an inward extension of the fishing line leader 28. Such pressure exertion causes mutual frictional engagement substantially across a greater portion of the width and breadth of the wound fishing line 29 and compression of the portion of the wound fishing line 29 immediately adjacent to the fishing line leader 28 and inward of the bead 18 against the wound fishing line 29. Such mutual frictional engagement inhibits and minimizes and stops unraveling of the wound fishing line 29, thereby also fixing the display and position of the fishing line leader 28 in extension from the orifice 20 of the bead 18. Additional holding power is also exerted against the fishing line leader 28 as the fishing line leader 28 passes though the orifice 20 of the bead 18 where spring-loaded intimate contact of the fishing line leader 28 at two points of the orifice 18 occurs utilizing the memory tendencies of the fishing line leader 28.

Mode of Operation

Figure 5:
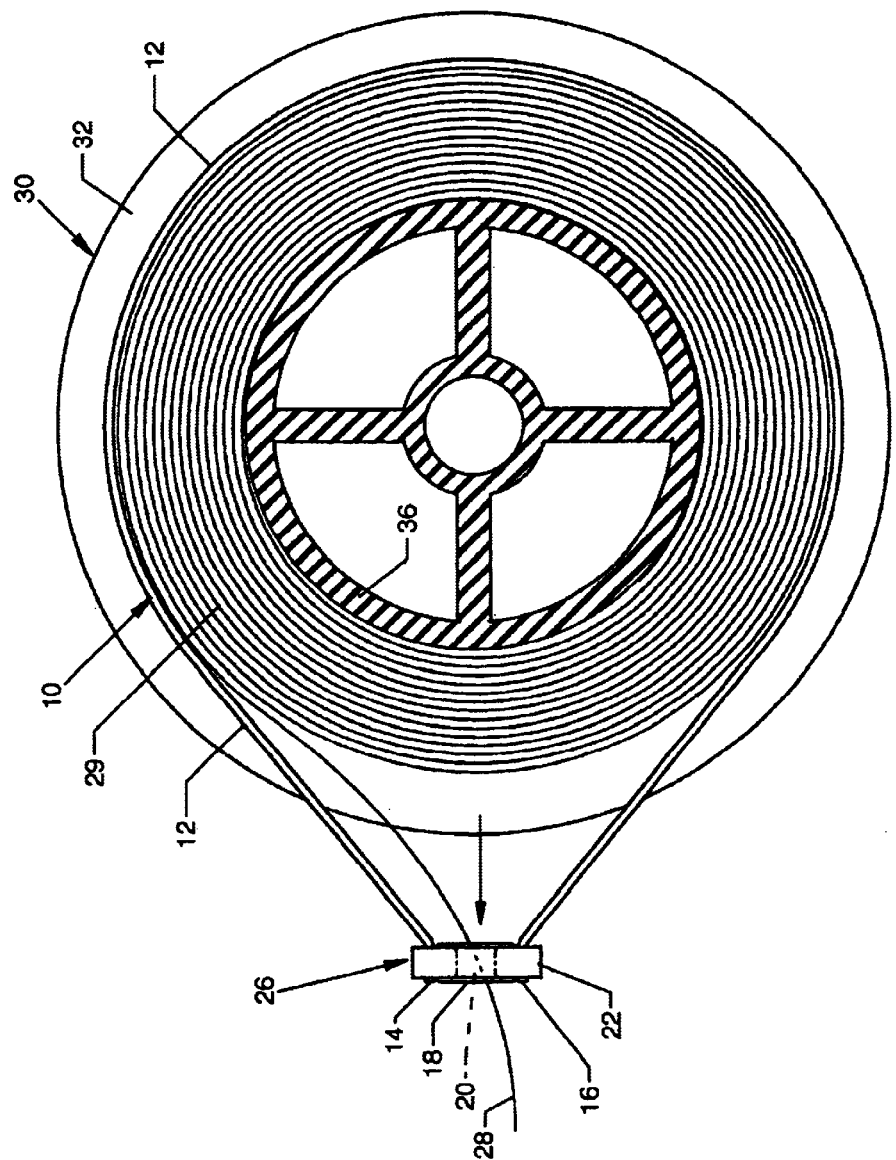
FIG. 5 illustrates the loading of the fishing line leader holder system about the periphery of the wound fishing line contained by the supply spool and the loading of the fishing line leader within the orifice of the bead; and, FIG. 6 illustrates the dispensing of wound fishing line from the supply spool.

FIG. 5 illustrates the loading of the fishing line leader holder system 10 about the periphery of the wound fishing line 29 contained by the supply spool 30 and the loading of the fishing line leader 28 within the orifice 20 of the bead 18. Whilst maintaining manual control of the fishing line leader 28, the approximate midpoint of the elastic band 12 is placed against the 3 o'clock position of the wound fishing line 29 and then the grasping knob 26 and the portion of the elastic band 12 adjacent to the grasping knob 26 is grasped and is positioned to stretch the elastic band in a position aligned with the wound fishing line 29 and the supply spool 30, as shown. The fishing line leader 28 is then inserted into and pulled a suitable distance through the orifice of the bead 18 for suitable display and access. Then the grasping knob 26 is relaxed, thereby allowing the elastic band 12 to contract and assume a pressured position over and about the fishing line leader 28 to force and compress the fishing line leader 28 against the wound fishing line 29 to fixingly display the fishing line leader 28 in a position exterior and to the left of the bead 18. Such relaxing also allows the elastic band 12 to intimately engage substantially the entire circumference of the wound fishing line 29 to prevent unraveling about the supply spool 30.

Figure 6:
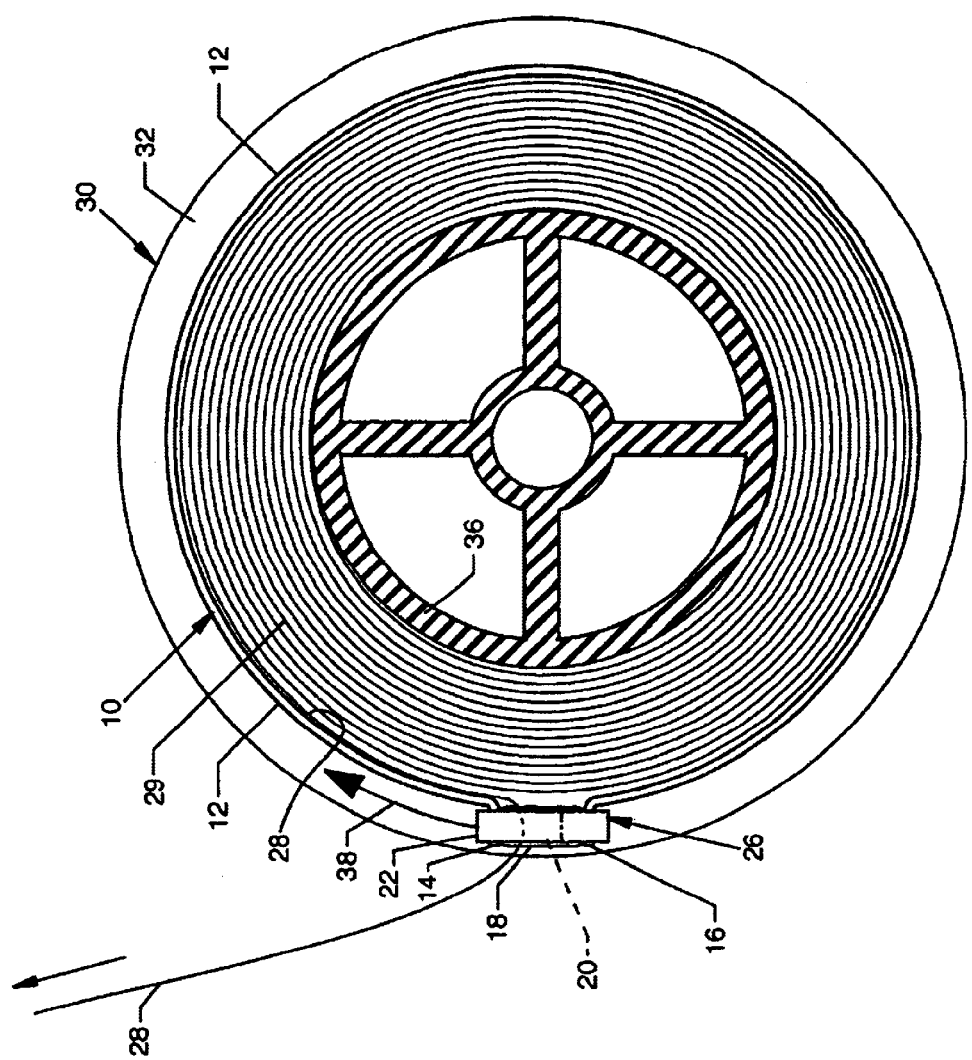

FIG. 6 illustrates the dispensing of wound fishing line 29 from the supply spool 30. Small lengths of fishing line can be dispensed without disturbing the position of the fishing line leader holder system 10, depending on the amount of compression and depending on the amount of slack about the supply spool which remains. Longer lengths of fishing line can be dispensed by exerting an outwardly and upwardly directed pressure on the fishing line leader 28 which causes the bead grasping knob 26 to be positioned as shown by arrow 38 about the axis of the supply spool 30 while at the same time correspondingly by such action pulling and rotating the elastic band 12 and thus the entire fishing line leader holder system 10 about the axis of the supply spool 30 and the wound fishing line 29. Such positioning allows the fishing line to be payed out through the orifice 20 of the bead 18 while maintaining compression of the wound fishing line 29 by the elastic band 12. An alternate method of dispensing is to manually position the grasping knob 26 about the wound fishing line as shown by arrow 38 and then pulling the fishing line through the bead 18.

Fishing Line Leader Holder System

Parts List

10 fishing line leader holder system
12 elastic band
14 end
16 end
18 bead
20 orifice
22 PVC tubing
24 adhesive
26 grasping knob
28 fishing line leader
29 wound fishing line
30 supply spool
32 side
34 side
36 drum
38 arrow Various modifications can be made to the present invention without departing from the apparent scope thereof. For example, although PVC has been indicated as the material of the flexible tubing 22, use of PVC for constructing the flexible tubing 22 is not essential. Other equally suitable materials could be used.

It is claimed:

1. A fishing line leader holder system comprising:
   a. an elastic band having two ends;
   b. a bead having a centrally located orifice; and,
   c. a flexible tubing, the two ends of the elastic band being secured by frictional engagement and by the use of a suitable adhesive between the bead and the flexible tubing.

2. A process of holding a fishing line tightly on a fishing line supply spool, positioning a leader of the fishing line for ready grasping, and dispensing fishing line from the fishing line supply spool comprising the steps of:
   a. providing an elastic band having two ends connected to a toroidal bead which has a centrally located orifice;
   b. stretching the elastic band and placing it about fishing line wound on the fishing line supply spool;
   c. threading the leader of the fishing line outwardly through the centrally located orifice of the toroidal bead;
   d. permitting the elastic band to retract to tightly engage the fishing line wound on the fishing line supply spool; and,
   e. grasping and pulling the leader of the fishing line to pay out fishing line from the fishing line supply spool.

3. The process of claim 2, wherein the two ends connected to the toroidal bead are opposingly arranged about the toroidal bead.

4. The process of claim 2, wherein the two ends are adhesively connected to the toroidal bead.

5. The process of claim 2, wherein the two ends are frictionally connected to the toroidal bead.

6. The process of claim 2, wherein the two ends of the elastic band are connected to the toroidal bead by a flexible tubing.

7. The process of claim 6, wherein the two ends are opposingly arranged about the toroidal bead and the tubing encompasses the ends and the toroidal bead.

8. The process of claim 6, wherein the two ends are adhesively connected to the flexible tubing.

9. The process of claim 6, wherein the flexible tubing is PVC tubing.

10. The process of claim 6, wherein the two ends of the elastic band, the toroidal bead, and the flexible tubing define a grasping knob, and wherein the grasping knob facilitates installation and removal of the elastic band from the fishing line supply spool and facilitates sliding positioning of the elastic band and grasping knob around and about the supply spool and the fishing line engaged thereon.

11. The process of claim 2, wherein the step of threading follows the step of stretching and precedes the step of permitting the band to retract.

12. The fishing line leader holder system of claim 1, wherein the bead is a toroid.

13. The fishing line leader holder system of claim 1, wherein the flexible tubing is a flexible PVC tubing.

14. The fishing line leader holder system of claim 1, wherein the two ends are opposingly arranged about the bead.

15. The fishing line leader holder system of claim 1, wherein the two ends are adhesively connected to the flexible tubing.

16. The fishing line leader holder system of claim 1, wherein the two ends are adhesively connected to the bead.

17. The fishing line leader holder system of claim 1, wherein the two ends are frictionally connected to the flexible tubing.

18. The fishing line leader holder system of claim 1, wherein the two ends are frictionally connected to the bead.

19. A process of holding a fishing line tightly on a fishing line supply spool, positioning a leader of the fishing line for ready grasping, and dispensing fishing line from the fishing line supply spool comprising the steps of:
   a. providing an elastic band having two ends, a bead with an orifice, and a flexible tubing, the two ends of the elastic band being secured by a combination of frictional engagement and adhesive between the bead and the flexible tubing, the two ends, bead and flexible tubing defining a grasping knob;

b. stretching the elastic band and placing it about fishing line wound on the fishing line supply spool while holding the grasping knob;

c. threading the leader of the fishing line outwardly through the orifice of the bead while the elastic band is stretched about the fishing line wound on the fishing line supply spool;

d. permitting the elastic band to retract to tightly engage the fishing line wound on the fishing line supply spool; and, e. grasping and pulling the leader of the fishing line to pay out fishing line from the fishing line supply spool.

20. The process of claim 19, further comprising the step of subsequently dispensing additional desired lengths of fishing line through the orifice.

* * * * *